United States Patent [19]
Rosenberg

[11] 3,719,021
[45] March 6, 1973

[54] PACKAGING MACHINE
[75] Inventor: Harry Rosenberg, Philadelphia, Pa.
[73] Assignee: New Jersey Machine Corporation, Hoboken, N.J.
[22] Filed: Feb. 11, 1971
[21] Appl. No.: 114,635

Related U.S. Application Data

[62] Division of Ser. No. 498,354, Oct. 20, 1965, Pat. No. 3,589,913.

[52] U.S. Cl. ...................53/180, 53/183, 53/204
[51] Int. Cl. ...............................B65b 9/08
[58] Field of Search......53/28, 29, 180, 182, 183, 13, 53/204

[56] References Cited

UNITED STATES PATENTS

| 3,339,337 | 9/1967 | Rapp et al. | 53/180 |
| 3,333,395 | 8/1967 | Doucette et al. | 53/182 |
| 2,336,962 | 12/1943 | Salfisberg | 53/180 |
| 2,245,827 | 6/1941 | Salfisberg | 53/180 X |
| 2,160,367 | 5/1939 | Maxfield | 53/28 X |
| 2,826,025 | 3/1958 | Swartz | 53/180 |

Primary Examiner—Granville Y. Custer, Jr.
Assistant Examiner—Eugene F. Desmond
Attorney—John J. Hart

[57] ABSTRACT

Sealing jaws are constructed and operated to form packages from ply material by a two stage sealing operation. In the first state the jaws while located at one position form an incomplete package having a material receiving chamber. The jaws and plies are then advanced to a second position where mechanism fill the chamber of the incomplete package with the product to be contained in the package. The jaws are then returned to the first position where they perform the second stage to complete the package and simultaneously perform the first stage in the formation of a succeeding package. Means are provided to open the receiving chamber while the incomplete package is still held by the jaws to enable the product to be inserted therein. A saw tooth cutter is employed to weaken the ply material between adjacent packages and to completely sever a predetermined number of them.

6 Claims, 16 Drawing Figures

PATENTED MAR 6 1973

INVENTOR.
HARRY ROSENBERG

By John J. Hart
ATTORNEY

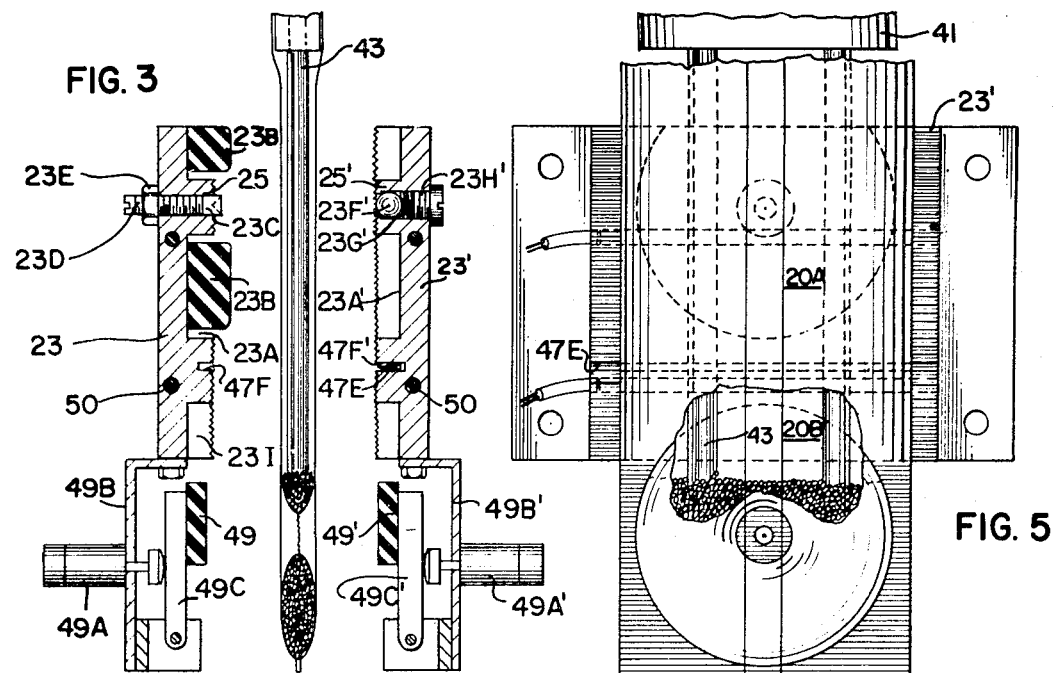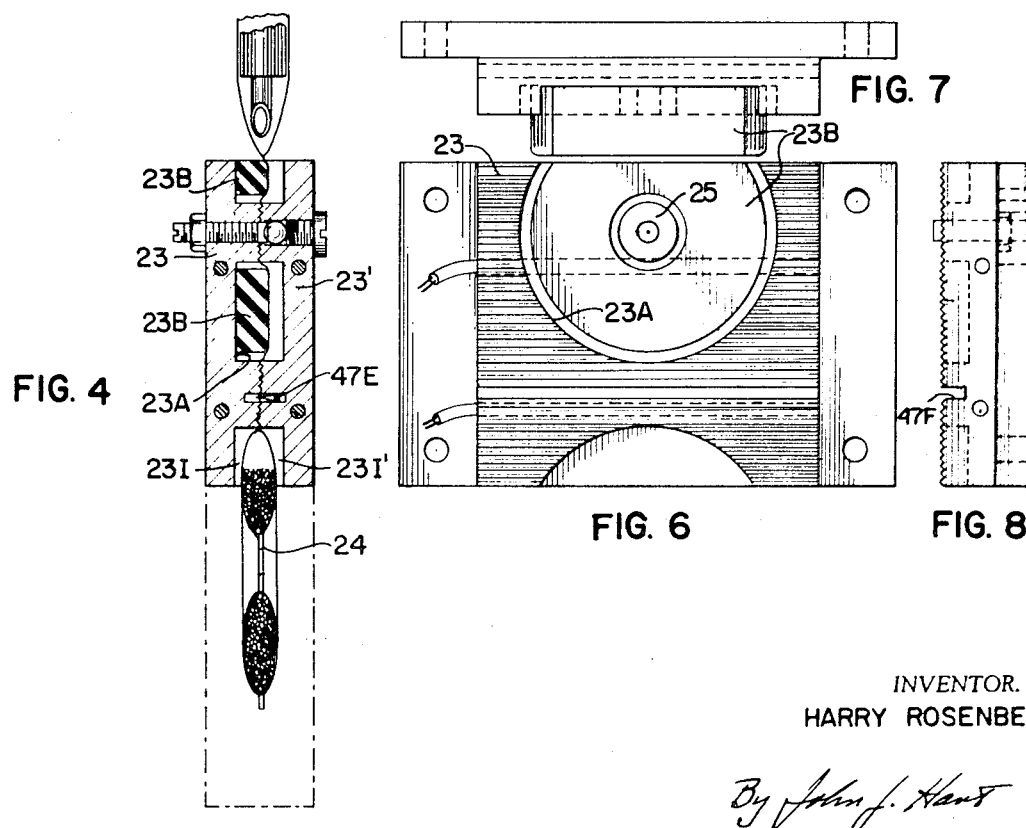

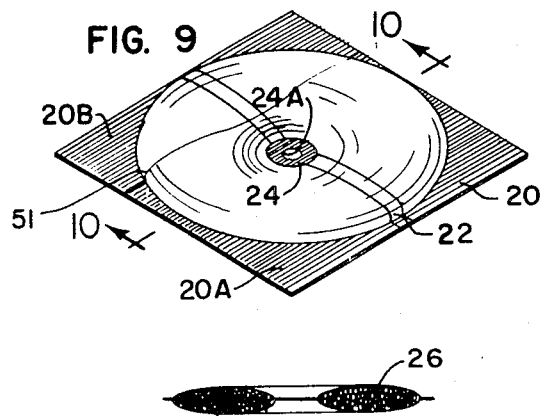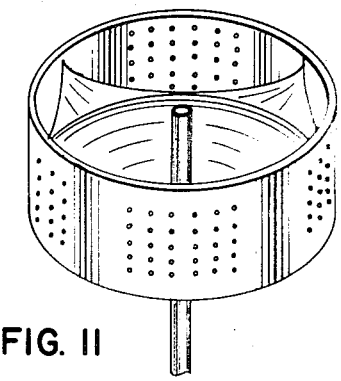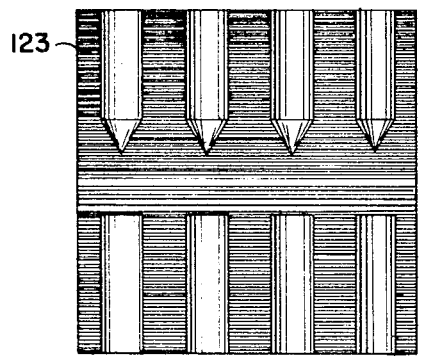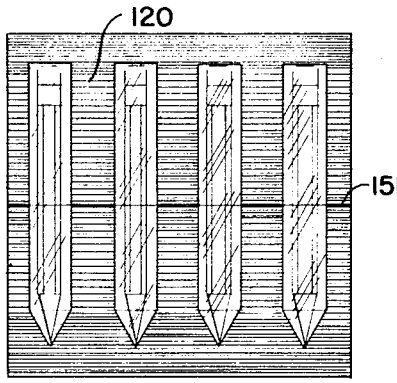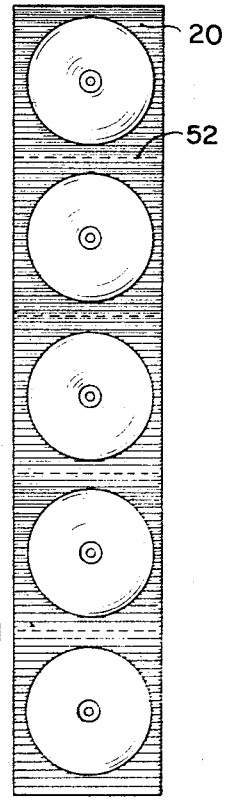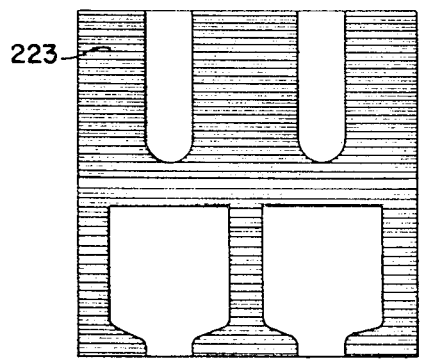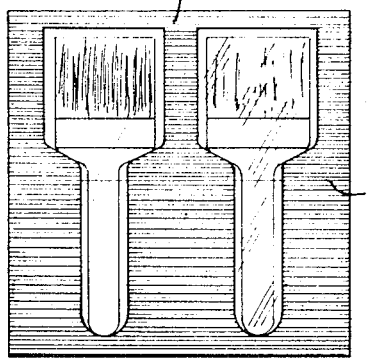

PACKAGING MACHINE

This application is a division of application Ser. No. 498,354, filed Oct. 20, 1965, now U.S. Pat. No. 3,589,913, issued June 29, 1971.

THE INVENTION

The present invention relates to packaging and more particularly to a machine for making packages of coffee for use in conventional percolators.

Heretofore coffee has been loosely packaged and the granular coffee has been placed in the circular strainer of a percolator-type coffee pot for brewing the desired flavor and the coffee grounds have been difficult to completely remove from the strainer with resulting loss of time and inconvenience to the householder.

An object of the present invention is to provide a machine for making a package having the proper shape and the proper amount of coffee in the package for producing the desired flavor in coffee brewed in a percolator.

A further object is to provide a packaging machine which is useful for many types of packages and is particularly useful in forming a package of doughnut shape.

Other and further objects will be apparent as the description proceeds and upon reference to the accompanying drawings wherein:

FIG. 1 diagrammatically illustrates the clamping members, the package forming jaws and the means to form a tubular sheet around a tubular mandrel with filling pipes and package opening air jets positioned within the mandrel and showing the package forming jaws with the clamping members in open uppermost position.

FIG. 3 is a fragmentary section of the jaws in open position corresponding to FIG. 1 and also showing the punch means and the strippers for removing the partially formed package from the jaws.

FIG. 4 is a fragmentary sectional view of the jaws in closed position corresponding to FIG. 2.

FIG. 5 is an elevation of a strip of formed packages as shown in FIG. 3 with one of the jaws in the background and showing the filling tubes in filling position for the previously formed package section.

FIGS. 6, 7 and 8 are elevation, top plan and front end view, respectively, of one of the jaws.

FIG. 9 is a perspective of a completed doughnut-shaped package with coffee therein.

FIG. 10 is a section taken substantially on line 10—10 of FIG. 9.

FIG. 11 shows the package of FIG. 10 in the sieve of a percolator.

FIG. 12 is a plan view of a series of connected packages similar to that shown in FIG. 10 with perforations therebetween to permit separation.

FIG. 13 is a view of another form of jaw for making a package of the type shown in FIG. 14.

FIG. 15 is a view of the face of another jaw for making a package of the type shown in FIG. 16.

Figure 1:
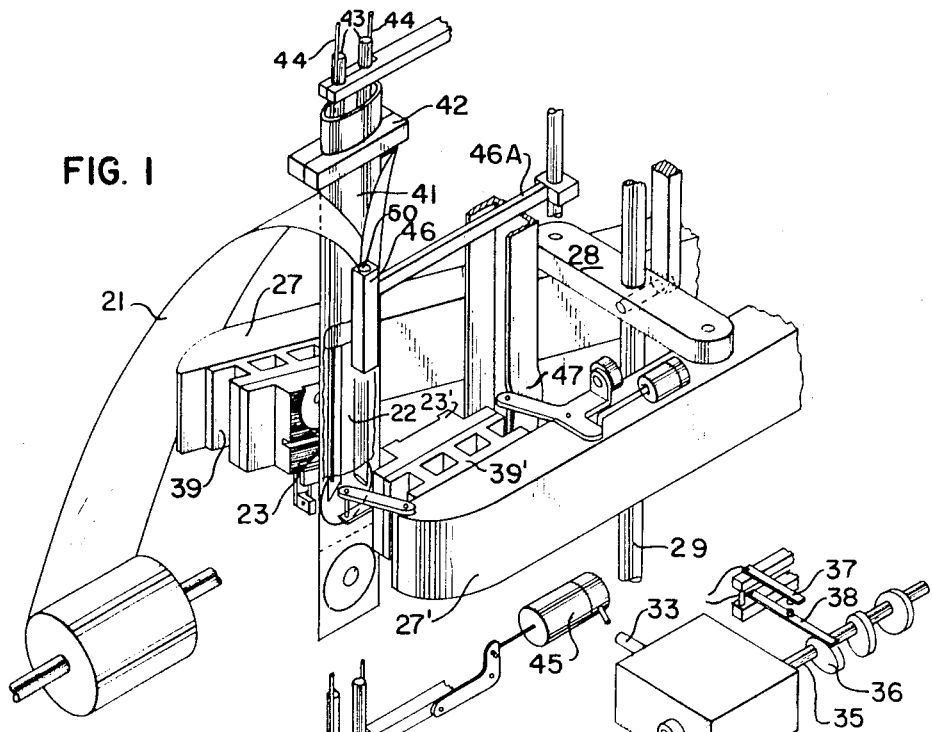
Figure 2:
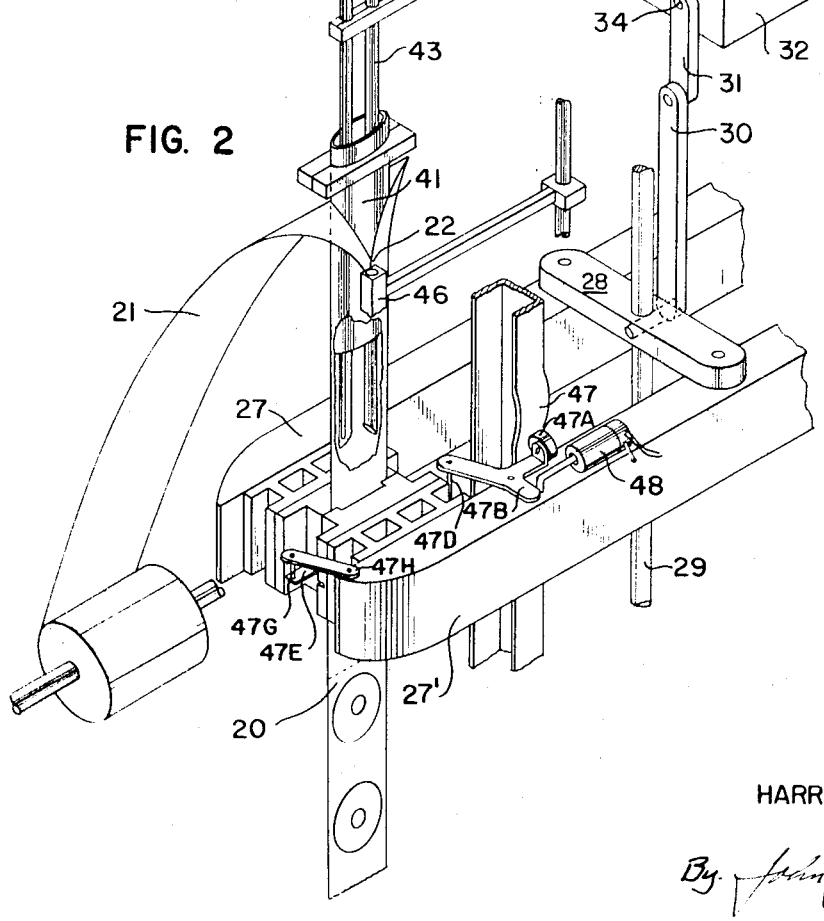
FIG. 2 shows the clamping members and jaws in closed position at the downward limit of motion and also shows the means to raise and lower the clamping members the desired distance and also showing means to raise and lower the filling tubes and showing the filling tubes in their raised position.

Referring more specifically to the drawings, a package 20 shown in FIGS. 9 and 10 is made of a single web 21 in FIGS. 1 and 2 of filter paper type material coated on one surface which is folded inwardly and an overlapping seam 22 is formed by contacting the inner surfaces of the margins together and heat sealing the same to provide a seam of two plies overlying the package 20. The marginal portions of the package 20 are heat sealed together by corrugated jaws 23,23' which have intermeshing corrugations to assure secure pressure on the web material, and a center area 24 is heat sealed by central jaw elements 25,25' thereby producing a doughnut shaped package in which coffee 26 is shown in FIG. 10.

Referring more particularly to FIGS. 1 to 8, inclusive, the machine for packaging coffee includes a pair of clamp members 27,27' pivotally mounted on a link 28 which is vertically movable relative to a supporting frame (not shown) by means of a rod 29 mounted for sliding movement in the frame, and suitable means are provided beyond the right ends of such clamp members as shown in FIGS. 1 and 2 to move the clamping members from the open position shown in FIG. 1 to the closed position shown in FIG. 2 and to reversely move such clamp members. The means for performing this function are well known and include an air cylinder having a solenoid controlled valve with suitable stops provided to assure the proper positioning of the clamping members in open and closed position.

Means are provided to move the clamp members transversely of their opening and closing positions and parallel to the rod 29. Such means include an adjustable pitman 30, an adjustable crank 31, and a gear reduction box 32 for driving the crank shaft 34 and driven by means of a shaft 33 from any suitable source of power. The crank shaft 34 has a rearwardly extending cam shaft section 35 carrying a plurality of cams 36 which operate a plurality of switches 37 having arms 38 serving as followers to cooperate with the cams 36 to open and close electrical circuits at predetermined time intervals.

The jaw 23 is mounted on the clamp member 27 by any suitable means including a spacing element 39 while the jaw 23' is mounted on the clamp member 27' by means of a suitable spacer 39'. Each jaw is provided with a generally circular recess and since such recesses are similar, only one jaw 23 will be described, and where necessary the similar item will be identified by the same reference numeral with a prime (') after the reference numeral.

The jaw 23 is provided with a recess 23A which is greater than half a circle with the center section 25 being on the geometrical center of the curve and within the generally annular shaped recess 23A. A pad of yieldable resilient material 23B such as foam rubber or the like is mounted with the margins thereof being spaced approximately half an inch from the margins of the recess and the exposed face of the resilient pad extending beyond the corrugated face of the jaw. A tubular punch member 23C is mounted centrally of the boss 25 and held in adjusted position by a screw 23D and a lock nut 23E. The punch 23C cooperates with a ball 23F' which is carried by the jaw 23' and which is spring pressed by a spring 23G', the tension of which is adjusted by a screw 23H' with the ball being prevented from passage out of the bore by an internally extending rib. The tubular punch 23C, when the jaws are in closed position, projects beyond the corrugated face of the jaw 23 and extends into the bore carrying the ball 23F' thereby producing a cutting force on sheet material therebetween to produce an aperture 24A in the package (See FIG. 9).

The web of material 21 is fed from a supply roller over suitable guides (not shown) around a mandrel 41 supported in fixed position by a support 42, such mandrel being eliptical in shape and hollow for receiving a pair of filling tubes 43 and air supply tubes 44. The filling tubes and air supply tubes are movable vertically as a unit by means of a solenoid controlled air cylinder 45 in FIG. 2, suitably mounted on the frame to raise and lower the filling tubes and air tubes. The lower ends of the filling tubes 43 are cut at an angle to provide a large mouth with the mouths of the tubes facing each other and adapted to extend into a partially formed package as shown in FIGS. 1 and 5.

In FIG. 1 the filling tubes 43 are shown in filling position for a package which has been partially formed by the upper portions of the jaws 23 and 23' to leave the sides of the bags unattached in the area of the recesses 23A and 23A' so the filling tube 43 may extend into the partially formed package to guide the coffee into the lower portion thereof.

At this time the web of material 21 is folded to place the inner marginal surfaces thereof in contact with each other to form the double ply marginal seam 22 against the mandrel 41. A heated sealing bar 46 is pressed against the marginal seam 22 thereby sealing the marginal edges to provide a tube of the web material on the mandrel.

The filling tubes 43 are then withdrawn by operation of the air cylinder 45 by one of the cams 36 and one of the switches 37 to a raised position out of the path of the jaws 23,23'. The jaws are closed by actuating the clamp members 27,27' when the jaws are in their raised position which is the position shown in FIG. 1 with the jaws in opened condition. In their raised position the jaws will be located below the bottom end of the mandrel 41. Thus, the closing of the jaws by the clamp members 27 and 27' causes the jaws to close on a portion of the tube of filter material positioned below the mandrel thereby compressing such tube portion to flat condition and sealing a central section 24 therein and the major peripheral section 20A to be formed in such tube portion outside of the recess 23A in the part of such tube portion located between the upper edge portions of the jaws. At the same time, the lower edge portions of the jaws in which there are generally circular recesses 231 and 231' seal the remaining marginal portion 20B of the preceding package that was formed in a previous operation, as clearly shown in FIG. 4. The closed clamps and jaws are moved downwardly from the position shown in FIG. 1 to the position shown in FIG. 2 to feed the partially formed package as well as the previously completely formed package one increment the length of the package. At this time the bar sealing element 46 is released to permit the free movement of the tube downwardly along the mandrel 41.

During this downward movement, a cam 47 mounted on a channel member of the frame is engaged by a follower 47A which moves a bell crank 47B connected by a link 47D to a cutter bar 47E which lies in a recess 47F' in the jaw 23'. The other end of the cutter 47E is connected by a link 47G to a member 47H pivotally connected to the clamp member 27' so as to produce in cooperation with the corresponding arm of the bell crank lever 47B a substantially parallel motion of the cutter bar 47E. The cutting edge of the blade 47E is provided with serrations and is adapted to be received in a recess 47F provided in the jaw 23. The cutter 47E acts to cut the tube of material between the previously formed package and the partially formed package during such downward movement of the clamping members and the jaws. The cam 47 and follower 47A are arranged to produce only partial movement of the cutter 47E so that its serrated cutting edge produces only a number of perforations between the adjacent packages without completely severing one package from another. Suitable spring means are provided to normally retain the cutter 47E in its inoperative position within the recess 47F'.

Since it is frequently required to have a number of packages in a connected group and to have one connected group severed from another, complete cutting means is provided by means of a solenoid controlled air cylinder 48 which is operated in timed sequence by a stepping switch operated a step at a time by one of the switches 37 driven by one of the cams 36. By the suitable selection of a stepping switch and the proper adjustment thereof, any predetermined number of packages can be connected in a single group and the tube of material severed after a predetermined number of such packages, such as for example ten or a dozen, or may be one hundred have been formed. The thus connected packages can be packaged in an accordion folded arrangement, if desired.

To assure sufficient fullness in the portions of the web material within the outlines of the recesses 23A, 23A', the resilient pad 23B during the closing of the jaws, pushes the web material laterally into the recess 23A' of jaw 23', as shown in FIG. 4. By this operation there is assured sufficient fullness in the product carrying portion of the package to accommodate the desired amount of coffee or other material that the package is designed to carry.

It will be understood that the corrugations, i.e., grooves and lands formed in the jaw surfaces serve to increase the pressure on the web material and that some of the web material engaged by such serrated surfaces may tend to remain in contact with the jaw faces. To prevent this from occurring, stripper pads 49,49' are mounted on the jaws 23 and 23' for movement toward and away from the package. The pads 49,49' are operated in timed relation by suitable solenoid controlled air cylinders 49A,49A' mounted on brackets 49B, 49B' attached to the lower ends of the jaws. The brackets also pivotally support frames 49C,49C' which carry the pads 49,49'. The air cylinders 49A,49A' are operated by the cam and switch mechanism previously described.

OPERATION AND METHOD

From the above description, it will be understood that in the operation of the machine, the web 21 is fed around the mandrel 41 on which it is formed into a tube with an overlapping seam 22. The seam is heat sealed by the sealing bar 46 which presses the seam 22 against the mandrel 41 when actuated by suitable means operating on the pivoted support 46A through a suitable solenoid controlled pressure cylinder controlled by a cam and switch. With the jaws in their raised position as shown in FIG. 1 and with the filling tubes 43 in their raised position as shown in FIG. 2, the jaws are closed as shown in FIG. 2 thereby forming in the upper part of the tube portion engaged by such jaws an open incomplete package of more than half a circle and extending up to the imaginary dividing line 51 shown in FIG. 9; which imaginary line indicates the top of the jaws 23,23'. Simultaneously there is also formed the top section 20B of the previously formed package thereby completing such preceding package and sealing therein the coffee with which it has been filled. The jaws are then moved down with the jaws still in their closed position a distance corresponding to the length of a package and the jaws are then opened while the sealing bar 46 is pressed against the seam 22. The filling tubes 43 are lowered to the filling position shown in FIG. 3 and coffee is then passed through such filling tubes into the partially formed package 20A made by the jaws in their raised position. After the necessary amount of coffee has been placed in the partially formed package 20A, the filling tubes 43 are withdrawn and the clamping members and jaws are moved to their raised position ready to form another package. During the downward movement of the jaws and the clamping members and while the jaws are still closed, the cutter 47E is actuated by the cam 47, as explained above, to produce a plurality of perforations 52 between the packages 20 shown in FIG. 12. After a predetermined number of packages have been formed such as the five shown in FIG. 12, the solenoid controlled piston and cylinder 48 are actuated to completely sever the five packages from the web.

In FIGS. 13 and 14, a modified jaw 123 and a modified package 120 is shown in which pencils are packaged in a transparent film by using dies of a type shown at 123 and using the machine of the present invention with a plurality of guide tubes 43 corresponding to the number of pencils in a package. When the jaws 123 are closed in their raised position as previously explained, the bottom portion of the package below the imaginary line 151 is formed with the upper portion of the die and the upper portion of the package above the line 151 being formed by the lower portion of the die. With this arrangement it is possible to package very long pencils even with a relatively short die or jaw, since it is only necessary that a package be closed at both ends and by suitable adjustment of the crank 31 and the pitman 30 will provide for the desired length of package.

The die 223 shown in FIG. 15 is used to form the package 220 in FIG. 16 which shows how an object having a wide portion at one end and a narrow portion at the other, such as a paint brush, can be packaged by the present equipment using suitable guide tubes of the proper shape to feed the paint brushes to the partially formed package shown below the dividing line 251. It will be evident that longer paint brushes can be packaged with the same dies or jaws by obtaining the desired adjustment of the crank 31 and the connecting rod 30.

It will be apparent that when the package of coffee shown in FIG. 10 is used in a sieve of a percolator such as shown in FIG. 11, the vertical tube of the percolator sieve is inserted through the opening 24A of the package and the marginal portions of the package outside of the doughnut-shaped body thereof are positioned in the percolator either extending upwardly or downwardly as shown.

It will thus be seen that applicant has provided a new and useful machine for producing expeditiously coffee packages which enable the making of coffee without having coffee grounds retained in the sieve or passing into the percolator.

The jaws clamp members 27,27' are moved to and from each other by means of an air cylinder extending substantially parallel to the clamp members and lying therebetween with the cylinder mounted on a fixed portion of the frame and the piston rod connected to one end of each of two links. The other ends of such links are pivoted to the respective clamp members whereby the clamp members move in accurately controlled timed relation to each other. The clamp activating air cylinder is controlled by one of the cams 36, one of the switches 37 and the cooperating follower 38 which controls a solenoid valve causing the air to be driven into the clamp actuating cylinder.

The clamp members 27,27' also carry the stripper pads 49, 49' operated in timed relation to assure that the package is released from the jaws and also to assure that air enclosed within the package 20 is expelled by the yieldable force exerted by the air cylinders 49A and 49A', thereby making it possible to package a number of packages of coffee or other granular material in a minimum of space and consequently to reduce the overall size of the shipping and storage facilities needed.

The sealing bar 46 and the jaws are heated by suitable electrical resistance heating units 50 in FIG. 3 which are controlled by suitable thermostats to obtain the desired heating effect and thereby seal the edges of the packages. The filter paper used for the coffee packages is coated with a suitable material which heat seals the seam formed by the overlap of the web material 21.

In some packaging it is desirable to use an impervious web of material such as a metal foil. In such cases where it is desired to have the material used to package coffee, the metal foil will be perforated by suitable means such as needles mounted in one jaw adapted to extend into the recess in the other jaw and cooperate with a platen so the needles will produce the desired arrangement of holes in the impervious material thereby adapting the present machine for multiple uses.

The air tubes 44 carried by the coffee guide filling tubes serve to effectively spread the opposite walls of the partially formed package section 20A before the coffee is fed to avoid any objectionable interference with the flow of coffee into the partially formed package section. It will be apparent that suitable means controlled by the cam shaft 35 cause the flow of air and the stoppage of the flow of air to obtain the desired effect and to avoid any back pressure that might interfere with the flow of coffee through the filling tubes 43. It will also be apparent that the flow of coffee is controlled by suitable means operated by the cam shaft 35.

The machine may be used for making many different types of packages with the selection of the proper jaws and the selection of the proper length of movement of the jaws in a direction transverse to their closing and opening movement.

It will be apparent that changes may be made in the precise construction within the spirit of the invention as defined by the valid scope of the claims.

I claim:

1. A packaging machine for making a succession of sealed packages each having a material receiving chamber formed by an outer peripheral sealed area and an inner sealed area, comprising means for intermittently feeding a pair of plies of package material linearly, movable ply material sealing means cooperative to form the packages, means operative to move said sealing means relative to said ply material to a first position and at such position to cause said sealing means to cooperate to seal the plies in a period of rest of the plies, said sealing means being constructed to form in such first sealing position a major part only of a first package including the inner sealed area and part of the outer peripheral sealed area composed of the leading end edge portion of such outer peripheral sealed area in the direction of feed of the plies and a major portion of the side edges thereof but not the entire side edges so that the area between the inner seal and the partial outer peripheral seal form a material receiving chamber, said sealing operative means being operable to move said sealing means in said cooperative sealing condition and the sealed portions of said plies to a second spaced position, filling means operative at said second position during another period of rest in the feed of the plies to insert product material into the material receiving chamber formed by such inner seal and such partial outer peripheral seal, said sealing operative means being operable during said other period of rest to return said sealing means to said first position and into coactive sealing relation with a successive portion of said ply material to form a second incomplete package as aforesaid, said sealing means being constructed to seal simultaneously on said return to said first position the remaining part of said first package including the trailing end edge portion and the remainder of the side edges thereof to complete the sealing of all edges of the first package so as to provide a continuous peripheral seal around the inner sealed area and the material located between the latter and such continuous peripheral seal.

2. A packaging machine for making a succession of sealed packages, comprising means for intermittently feeding a pair of plies of package material linearly, movable ply material sealing means cooperative to form the packages, means operative to move said sealing means relative to said ply material to a first position and at such position to cause said sealing means to cooperate to seal the plies in a period of rest of the plies, said sealing means being constructed to form in such first sealing position a major part only of a first package including the leading end edge portion thereof in the direction of feed of the plies and a major portion of the side edges thereof but not the entire side edges by sealing the peripheral portions thereof, said sealing operative means being operable to move said sealing means in said cooperative sealing condition and the sealed portions of said plies to a second spaced position, filling means operative at said second position during another period of rest in the feed of the plies to insert product material into the sealed portion of the partially formed package, said sealing operative means being operable during said other period of rest to return said sealing means to said first position and into coactive sealing relation with a successive portion of said play material to form a second incomplete package as aforesaid, said sealing means being constructed to seal simultaneously on said return to said first position the remaining part of said first package including the trailing end edge portion and the remainder of the side edges thereof to complete the sealing of all edges of the first package so as to provide a continuous seal around the material in such first package, said sealing means comprising a pair of cooperative sealing jaws, each jaw having a relatively large recess opening on the jaw face and the trailing edge of each jaw in the direction of feed of the plies, and a separate smaller recess opening on the face and the leading edge of each jaw, first package forming means mounted within said larger recess of one jaw, and a cooperating second package forming means mounted within the larger recess of the other jaw, said first and second package forming means cooperating during the formation of said incomplete packages simultaneously to seal a localized area within the sealed portion of the incomplete package.

3. A packaging machine as defined in claim 2, in which said first package forming means comprises a punch, and said second package forming means comprises a cooperating platen, said punch and platen being operative to eliminate a portion of said localized area during the formation thereof.

4. A packaging machine for making a succession of sealed packages comprising means for intermittently feeding a pair of plies of package material linearly, movable ply material sealing means cooperative to form the packages, means operative to move said sealing means relative to said ply material to a first position and at such position to cause said sealing means to cooperate to seal the plies in a period of rest of the plies, said sealing means being constructed to form in such first sealing position a major part only of a first package including the leading end edge portion thereof in the direction of feed of the plies and a major portion of the side edges thereof but not the entire side edges by sealing the peripheral portions thereof, said sealing operative means being operable to move said sealing means in said cooperative sealing condition and the sealed portions of said plies to a second spaced position, filling means operative at said second position during another period of rest in the feed of the plies to insert product material into the sealed portion of the partially formed package, said sealing operative means being operable during said other period of rest to return said sealing means to said first position and into coactive sealing relation with a successive portion of said ply material to form a second incomplete package as aforesaid, said sealing means being constructed to seal simultaneously on said return to said first position the remaining part of said first package including the trailing end edge portion and the remainder of the side edges thereof to complete the sealing of all edges of the first package so as to provide a continuous seal around the material in such first package, said sealing means comprising a pair of cooperative sealing jaws, each jaw having a relatively large recess opening on the jaw face and the trailing edge of each jaw in the direction of feed of the plies, and a separate smaller recess opening on the face and the leading edge of each jaw, a section of resilient material mounted in and projecting from said larger recess of one jaw and adapted to extend into the larger recess of the other jaw during the cooperative sealing action of said jaws to deform the ply material within said other jaw to provide additional volumetric capacity in the partially formed package for the inserted product.

5. A package machine for making a succession of sealed packages, comprising means for intermittently feeding a pair of plies of package material linearly, movable ply material sealing means cooperating to form the packages, means operative to move said sealing means relative to said ply material to a first position and at such position to cause said sealing means to cooperate to seal the plies in a period of rest of the plies, said sealing means being constructed to form in such first sealing position a major part only of a first package including the leading end edge portion thereof in the direction of feed of the plies and a major portion of the side edges thereof but not the entire side edges by sealing the peripheral portions thereof, said sealing operative means being operable to move said sealing means in said cooperative sealing condition and the sealed portions of said plies to a second spaced position, filling means operative at said second position during another period of rest in the feed of the plies to insert product material into the sealed portion of the partially formed package, said sealing operative means being operable during said other period of rest to return said sealing means to said first position and into coactive sealing relation with a successive portion of said ply material to form a second incomplete package as aforesaid, said sealing means being constructed to seal simultaneously on said return to said first position the remaining part of said first package including the trailing end edge portion and the remainder of the side edges thereof to complete the sealing of all edges of the first package so as to provide a continuous seal around the material in such first package, said sealing means including a pair of opposed cutter receiving grooves, means supporting a cutter in one of said cutter receiving grooves for movement into the other cutter receiving groove during a sealing operation of said sealing means, means operative to cause said cutter to move to sever the plies partially in each of a given number of sealing operations, and to move to completely sever the plies at the end of each sequence of said given number of sealing operations.

6. A packaging machine for making a succession of sealed packages, comprising means for intermittently feeding a pair of plies of package material linearly, ply material sealing means operative during the periods of rest in the feed of said plies to form a succession of containers having material receiving chambers each formed by an outer peripheral sealed area, said sealing means including a pair of opposed cutter receiving grooves disposed transversely to the direction of feed of the plies, a saw tooth cutter completely contained in one of said grooves during the feeding movement of the plies, means movably supporting said cutter in said one groove and operable to move the cutter outwardly therefrom and into the other of said grooves during a period of rest of the plies, means successively operative to actuate said supporting means during the periods of rest of the plies to move said cutter out of said one groove in a controlled manner against the plies to cut the material of the plies between each package, said operative means being constructed and arranged during such controlled successive movements of the saw tooth cutter to move the same a given number of times a given distance such as will effect only a weakening of the plies between certain connected adjacent packages, and at interspersed given periods moving said saw tooth cutter a greater given distance such as to cause a complete severance of the plies between other adjacent packages, whereby one predetermined size group of connected packages will be completely separated from another predetermined size group thereof.

* * * * *